United States Patent
Brief et al.

(10) Patent No.: US 11,126,624 B2
(45) Date of Patent: Sep. 21, 2021

(54) TRIE SEARCH ENGINE

(71) Applicant: Western Digital Technologies, Inc., San Jose, CA (US)

(72) Inventors: David Brief, Modiin (IL); Eran Arad, Misgav (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 388 days.

(21) Appl. No.: 16/004,782

(22) Filed: Jun. 11, 2018

(65) Prior Publication Data

US 2018/0357280 A1 Dec. 13, 2018

Related U.S. Application Data

(60) Provisional application No. 62/518,267, filed on Jun. 12, 2017.

(51) Int. Cl.
- G06F 16/00 (2019.01)
- G06F 16/2453 (2019.01)
- G06F 16/951 (2019.01)
- G06F 16/22 (2019.01)
- G06F 16/31 (2019.01)

(52) U.S. Cl.
CPC .... G06F 16/24542 (2019.01); G06F 16/2246 (2019.01); G06F 16/322 (2019.01); G06F 16/951 (2019.01)

(58) Field of Classification Search
None
See application file for complete search history.

(56) References Cited

U.S. PATENT DOCUMENTS

| | | | | |
|---|---|---|---|---|
| 6,763,348 B2* | 7/2004 | O'Keeffe | ............ | G06F 16/9027 707/706 |
| 7,249,149 B1* | 7/2007 | Eatherton | ............ | H04L 45/7457 |
| 7,251,663 B1* | 7/2007 | Smith | ............ | G06F 12/10 |
| 7,308,459 B2* | 12/2007 | Avadhanam | ........ | G06F 16/2246 707/719 |
| 7,328,275 B1* | 2/2008 | Perttunen | ............ | G06F 16/9574 709/235 |
| 7,564,841 B2* | 7/2009 | Wybenga | ................ | H04L 45/00 370/389 |
| 9,329,991 B2* | 5/2016 | Cohen | ................ | G06F 12/0246 |
| 9,378,304 B2* | 6/2016 | Kirazci | ............... | G06F 16/9027 |
| 10,204,142 B2* | 2/2019 | Chakrabarti | ........ | G01C 21/3611 |
| 10,552,058 B1* | 2/2020 | Jadon | ...................... | G06F 3/061 |
| 10,642,748 B1* | 5/2020 | Lercari | ............... | G06F 12/1009 |
| 2004/0010752 A1* | 1/2004 | Chan | ........................ | G06F 16/80 715/234 |
| 2017/0123705 A1 | 5/2017 | Shelton | | |

* cited by examiner

*Primary Examiner* — Debbie M Le
(74) *Attorney, Agent, or Firm* — Patterson & Sheridan, LLP; Steven H. Versteeg

(57) ABSTRACT

A method of searching a database that includes executing a trie search algorithm on a first portion of data in the database, returning a tag narrowing a location of the first portion of data to optimize the database, and performing a directed search of the optimized database by executing the trie search algorithm again on the optimized database, where the trie search algorithm is an information retrieval data structure using a M-ary tree where each node consists of a M-positional vector of pointers.

8 Claims, 5 Drawing Sheets

| | LBA start (hex) | LBA end (hex) | Address ranges to match on: |
|---|---|---|---|
| Region 1 | 270000 | 29FFFF | 27,28,29 |
| Region 2 | 2A4000 | 2DFFFF | 2A4-2AF,2B,2C,2D |
| Region 3 | 2E4000 | 31FFFF | 2E4-2EF,2F,30,31 |
| Region 4 | 324000 | 35FFFF | 324-32F,33,34,35 |
| Region 5 | 364000 | 39FFFF | 364-26F,37,38,39 |
| Region 6 | 3A4000 | 3DFFFF | 3A4-3AF,3B,3C,3D |
| Region 7 | 3E4000 | 41FFFF | 3E4-3EF,3F,40,41 |
| Region 8 | 424000 | 45FFFF | 424-42F,43,44,45 |
| Region 9 | 464000 | 48FFFF | 464-46F,47,48 |

FIG. 4

| page 0 | page 1 (2x) | page 2 (3x) | page 3 (4x) | page 4 (2Ax) | page 5 (2Ex) | page 6 (32x) | ... | page 10 (42x) | page 11 (46x) |
|---|---|---|---|---|---|---|---|---|---|
| 0 No Match | 0 No Match | 0 Match 3 | 0 Match 7 | 0 No Match | 0 No Match | 0 No Match | | 0 No Match | 0 No Match |
| 1 No Match | 1 No Match | 1 Match 3 | 1 Match 7 | 1 No Match | 1 No Match | 1 No Match | | 1 No Match | 1 No Match |
| 2 Cont 1 | 2 No Match | 2 Cont 6 | 2 Cont 10 | 2 No Match | 2 No Match | 2 No Match | | 2 No Match | 2 No Match |
| 3 Cont 2 | 3 No Match | 3 Match 4 | 3 Match 8 | 3 No Match | 3 No Match | 3 No Match | | 3 No Match | 3 No Match |
| 4 Cont 3 | 4 No Match | 4 Match 4 | 4 Match 8 | 4 Match 2 | 4 Match 3 | 4 Match 4 | | 4 Match 8 | 4 Match 9 |
| 5 No Match | 5 No Match | 5 Match 4 | 5 Match 8 | 5 Match 2 | 5 Match 3 | 5 Match 4 | | 5 Match 8 | 5 Match 9 |
| 6 No Match | 6 No Match | 6 Cont 7 | 6 Cont 11 | 6 Match 2 | 6 Match 3 | 6 Match 4 | | 6 Match 8 | 6 Match 9 |
| 7 No Match | 7 Match 1 | 7 Match 5 | 7 Match 9 | 7 Match 2 | 7 Match 3 | 7 Match 4 | | 7 Match 8 | 7 Match 9 |
| 8 No Match | 8 Match 1 | 8 Match 5 | 8 Match 9 | 8 Match 2 | 8 Match 3 | 8 Match 4 | | 8 Match 8 | 8 Match 9 |
| 9 No Match | 9 Match 1 | 9 Match 5 | 9 No Match | 9 Match 2 | 9 Match 3 | 9 Match 4 | | 9 Match 8 | 9 Match 9 |
| A No Match | A Cont 4 | A Cont 8 | A No Match | A Match 2 | A Match 3 | A Match 4 | | A Match 8 | A Match 9 |
| B No Match | B Match 2 | B Match 6 | B No Match | B Match 2 | B Match 3 | B Match 4 | | B Match 8 | B Match 9 |
| C No Match | C Match 2 | C Match 6 | C No Match | C Match 2 | C Match 3 | C Match 4 | | C Match 8 | C Match 9 |
| D No Match | D Match 2 | D Match 6 | D No Match | D Match 2 | D Match 3 | D Match 4 | | D Match 8 | D Match 9 |
| E No Match | E Cont 5 | E Cont 9 | E No Match | E Match 2 | E Match 3 | E Match 4 | | E Match 8 | E Match 9 |
| F No Match | F Match 3 | F Match 7 | F No Match | F Match 2 | F Match 3 | F Match 4 | | F Match 8 | F Match 9 |

FIG. 5

TRIE SEARCH ENGINE

CROSS-REFERENCE TO RELATED APPLICATIONS

The present application claims priority to U.S. Provisional Patent Application Ser. No. 62/518,267, filed Jun. 12, 2017. The forgoing application is herein incorporated by reference in its entirety.

BACKGROUND OF THE DISCLOSURE

Field of the Disclosure

Embodiments of the present disclosure generally relates to searching a database in a data storage device. More specifically, this disclosure relates to a method for searching databases using a trie search algorithm.

Description of the Related Art

Many applications require long-term data storage and a high-degree of data integrity. Often, these needs are met by non-volatile data storage devices that store data without requiring a persistent power supply. Non-volatile storage or persistent media is provided by a variety of devices, most commonly, by solid state drives (SSDs). SSDs store data using non-volatile solid state electronic circuits without using movable mechanical parts. To read or write information to the memory cells of an SSD, a software application or operating system specifies a location for the data to be stored. For NAND flash SSDs, information is stored in blocks, which are erased an entire block at a time. Each block is made up of a plurality of pages, which are read or written an entire page at a time.

One commonly used memory addressing scheme for accessing the memory cells of a SSD is logical block addressing (LBA). As the complexity and number of applications have increased, the size of data storage systems has also increased. Thus, what is needed is a reliable and faster data search method for long-term storage devices.

SUMMARY OF THE DISCLOSURE

In one embodiment, a method of searching a database is disclosed that includes executing a trie search algorithm on a first portion of data in the database, returning a tag narrowing a location of the first portion of data to optimize the database, and performing a directed search of the optimized database by executing the trie search algorithm again on the optimized database, wherein the trie search algorithm is an information retrieval data structure using a M-ary tree where each node consists of a M-positional vector of pointers.

In another embodiment, a method of accessing data from a data storage device is disclosed that includes receiving, from a host device, an access request directed at a LBA, selecting a first portion of the LBA, performing a trie mapping of LBA's of a flash translation layer of the data storage device, wherein the flash translation layer includes a data address translation table, matching incremented first portions of the LBA to the trie mapping of a region of the flash translation layer, identifying a first region of interest in the flash translation layer where the LBA is located, narrowing a search of the LBA to the first region of interest, and returning a status signal to the data storage device indicating the results of the trie mapping.

In yet another embodiment, a data storage device is disclosed that has a volatile memory with a first flash translation layer, where the flash translation layer includes a data address translation table, and a trie mapping of LBA regions of the first flash translation layer, and a non-volatile memory array comprising one or more memory devices. The data storage device also includes a controller coupled to the volatile memory and coupled to the non-volatile memory, the controller having one or more processors operable to increment through portions of a received LBA and match incremented portions of the received LBA to the trie mapping. The data storage device also includes means for accessing data from the data storage device using a trie search algorithm.

In yet another embodiment, a storage device is disclosed having a controller with one or more processors configured to execute a trie search algorithm, where the trie search algorithm searches for LBA's in a flash translation layer, and where the flash translation layer includes a data address translation table. The storage device also includes a RAM array configured to store results from the trie search algorithm, a trie state machine, a LBA register, an input demultiplexer electrically coupled to the LBA register, and an output demultiplexer electrically coupled to the RAM array and the trie state machine, where the device generates an output signal that includes a state of the trie search algorithm.

In yet another embodiment, a method of writing data to a trie mapping table is disclosed that includes initializing a region in a memory device with one or more ranges of LBA's of interest, selecting which LBA ranges are to be searched for matches, searching the region based on the LBA ranges, identifying all full matches, partial matches, and no matches for each entry of the LBA ranges, and storing the LBA ranges and the results of the search into a trie mapping table of a memory device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is an example flash translation layer showing a table of LBA's organized into a plurality of regions as used by the trie mapping method of FIG. 2, according to one embodiment.

FIG. 5 is an example trie mapping data table as stored in RAM containing results of a directed search, according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

This disclosure includes a method of searching a database that includes executing a trie search algorithm on a first portion of data in the database, returning a tag narrowing a location of the first portion of data to optimize the database, and performing a directed search of the optimized database by executing the trie search algorithm again on the optimized database, wherein the trie search algorithm is an information retrieval data structure using a M-ary tree where each node consists of a M-positional vector of pointers.

Figure 1:
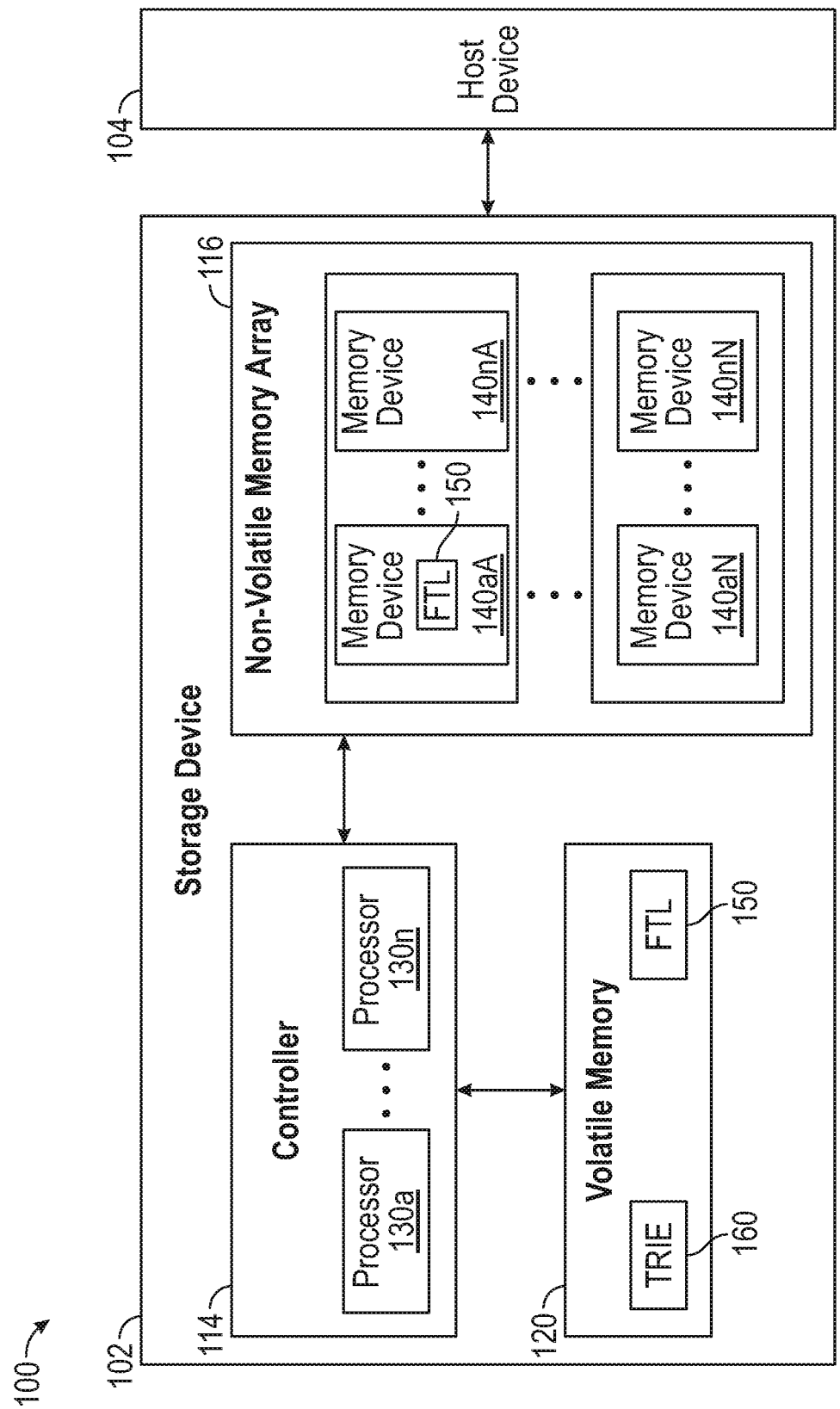
FIG. 1 is a schematic block diagram illustrating a data storage device employing a trie search algorithm, according to one embodiment.

FIG. 1 is a schematic block diagram illustrating a storage system 100 with a data storage device 102 coupled to a host device 104, where the data storage device 102 has a controller 114 that runs a trie search algorithm, according to one embodiment. The host device 104 may include any of a wide range of devices, including but not limited to computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, automobiles (control systems, navigation system, autonomous driving system, etc.), and the like. The host device 104 may utilize non-volatile memory devices included in the data storage device 102 to store and retrieve data.

The triefecta or "trie" search algorithm is a data structure that allows for a fast search and data retrieval over a large areas of memory. Trie searches are used to implement the abstract data type (ADT), where basic operations, such as search, insert, and delete can be performed. Further, a trie search can be used for encoding and compression of text. The trie search algorithm is commonly used in databases, as well as in networking technologies.

The data storage device 102 can take any suitable form. As illustrated in FIG. 1, the data storage device 102 can take the form of an embedded mass storage device, such as an eSD/eMMC embedded flash drive, embedded in the host device 104. In other embodiments, the data storage device 102 may be a removable mass storage device, such as, but not limited to, a handheld, removable memory device, such as a memory card (e.g., a Secure Digital (SD) card, a micro Secure Digital (micro-SD) card or a MultiMedia Card (MMC)), or a universal serial bus (USB) device. Other embodiments are possible and are not limited by the examples disclosed herein. The data storage device 102 may include non-volatile memory (NVM) array 116, which may include a plurality of memory devices 140aA-140nN (collectively, "memory devices 140"). Each of the memory devices 140 may be configured to store and/or retrieve data. In one embodiment, the memory device 140 may receive data and a message from the controller 114 that instructs the memory device 140 to store the data. Similarly, the memory device 140 may receive a message from controller 114 that instructs the memory device 140 to retrieve data. In some examples, each memory device 140 may be referred to as a die. In some examples, a single physical chip may include a plurality of dies (i.e., a plurality of memory devices 140aA-140nN). In some embodiments, each memory device 140 may be configured to store large amounts of data, such as 128 MB, 256 MB, 512 MB, 1 GB, 2 GB, 4 GB, 8 GB, 16 GB, 32 GB, 64 GB, 128 GB, 256 GB, 512 GB, 1 TB, or more data. The memory devices 140 may include any type of non-volatile memory devices. Some examples of memory devices 140 include, but are not limited to, NAND memory, NOR memory, phase-change memory (PCM), resistive random-access memory (ReRAM), magnetoresistive random-access memory (MRAM), ferroelectric random-access memory (F-RAM), holographic memory, magnetic media (including shingle magnetic recording), optical disks, floppy disks, electrically programmable read only memories (EPROM), electrically erasable programmable read only memories (EEPROM), and other solid-state memories.

The data storage device 102 may also include a volatile memory 120, which may be used by the controller 114 to temporarily store information. In some embodiments, controller 114 may use volatile memory 120 as a cache. For instance, controller 114 may store cached information in volatile memory 120 until the cached information is written to the memory device 140. Examples of volatile memory 120 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like)). In other embodiments, volatile memory 120 may be shared between multiple processors, where each processor may use a discrete portion of volatile memory 120. In yet other embodiments, each processor may use separate volatile memories 120.

The controller 114 may contain one or more processors 130a-130n. In some embodiments, the processors 130a-130n may be cores of a multi-core processor. In this disclosure, the term processor 130 refers to processors 130a-130n of the controller 114 of the data storage device 102, although in some embodiments, the techniques described herein may be performed by a general purpose processor, such as a host processor, for example, executing control code. The controller 114 may manage one or more operations of the data storage device 102. For instance, controller 114 may manage the reading of data from and/or the writing of data to one or more memory devices 140.

The host device 104 may generate a request, such as a read or write request, for one or more LBA addresses or LBA range, to the data storage device 102. In some embodiments, the controller 114 may use volatile memory 120 to store a logical-to-physical (or virtual-to-physical) data address translation table or database, referred to as a flash translation layer (FTL) 150. In other embodiments, FTL 150 may include entries that include a logical data address and a corresponding physical data address. In some embodiments, rather than each entry in the FTL 150 including a logical data address, FTL 150 may include an index that encodes the respective logical data address of each entry in the logical-to-physical data address translation table (e.g.: the FTL 150). In some embodiments, the FTL 150 may reside in several memory devices 140 at the same time. Host device 104 may refer to a unit of data using the logical data address, and controller 114 may utilize physical data addresses to direct writing of data to, and reading of data from, memory device 140.

In accordance with one or more techniques of this disclosure, controller 114 may consolidate multiple logical data addresses into a logical data address container. For one of the logical data addresses in the logical data address container, controller 114 may fully specify a physical data address corresponding to the logical data address. By fully specifying the physical data address, controller 114 may specify all location attributes such that the physical data address points to a precise location of memory devices 140 (e.g., a precise memory device 140, a precise block, a precise page, and the like). For the remainder of the logical data addresses in the logical data address container, controller 114 may partially specify the respective physical data address corresponding to each logical data address. The partially-specified physical data addresses may include less information than a fully-specified physical data address. By partially specifying the respective physical data addresses, controller 114 may specify sufficient address information so that, in combination with the fully-specified physical data address of the one logical data address, the respective physical data addresses are fully specified.

By reducing the number of bits required for at least some of the entries in the FTL 150, the volatile memory 120 consumed by FTL 150 may be reduced. Controller 114 may also cause FTL 150 to be stored in the NVM array 116, such as one of memory devices 140, and optionally cached to volatile memory 120 for faster access and response to received memory commands. Due to data write processes, such as garbage collection of memory devices 140 comprising NAND flash memory, FTL 150 is constantly updated due to changes in the stored data.

Embodiments of the disclosure utilize a trie mapping 160 of FTL 150 for rapid lookup of a received data access request of a LBA or LBA range on one of a plurality of regions of FTL 150. The trie mapping 160 may be initialized in volatile memory 120.

Figure 2:
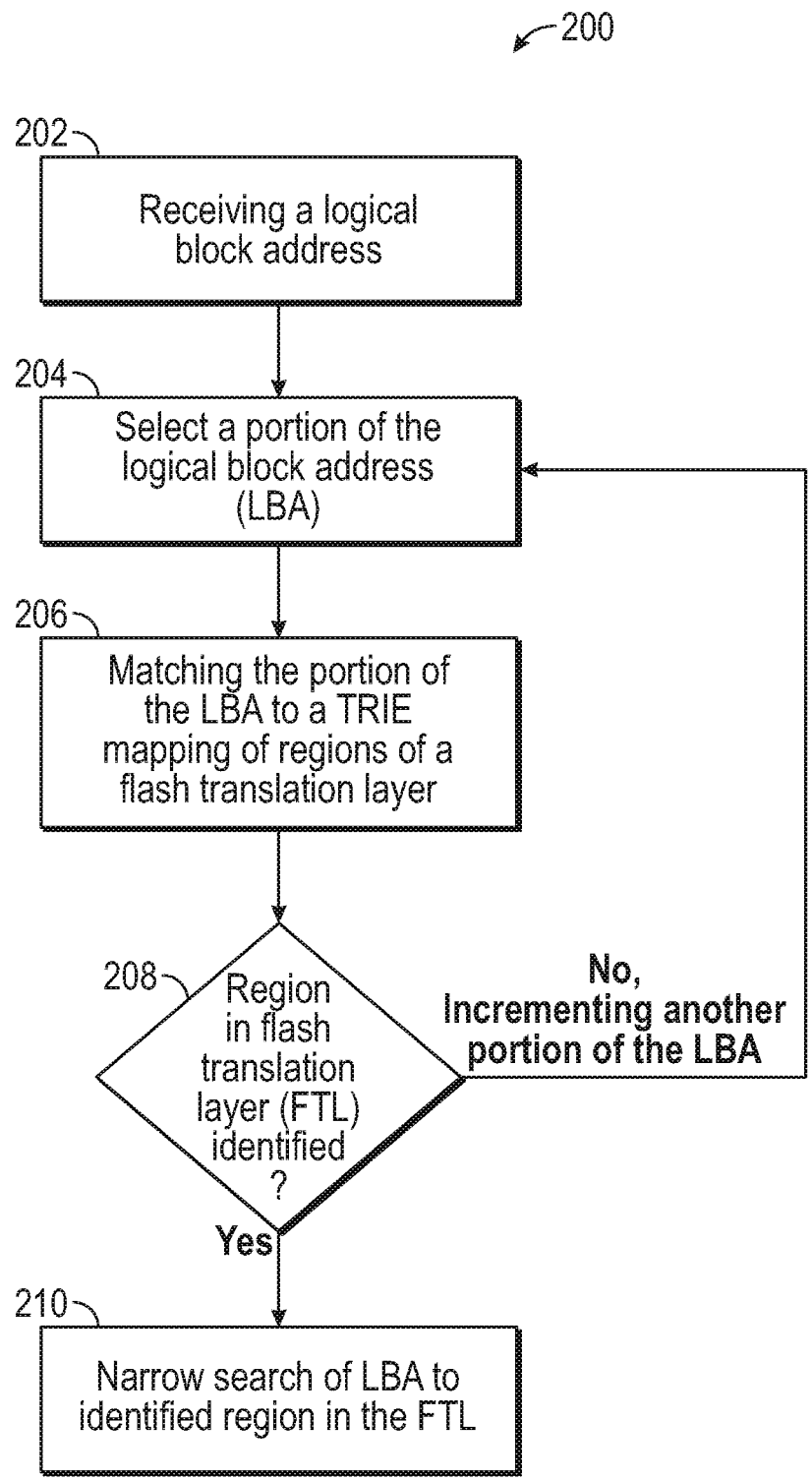
FIG. 2 is a flowchart illustrating a method of searching a database using trie mapping of LBA's, according to one embodiment.

FIG. 2 is a flowchart illustrating a method 200 of searching a database using trie mapping of LBA's, according to one embodiment. Method 200 is described in reference to data storage device 102 of FIG. 1, but other data storage systems are possible. One or more blocks of the method 200 may be performed by controller 114 executing machine-executable instructions in a non-transitory machine-readable medium stored, such as firmware stored in NVM array 116 or read-only memory (ROM) of data storage device 102. Method 200 discloses a process of performing a directed fast search to match a LBA or LBA range to a region of the FTL 150 by a trie search engine. The method 200 begins at block 202, where data storage device 102 receives an access request of a LBA or LBA range, such as reading or writing data or marking data for deletion. Next, at block 204, controller 114 selects a portion of the LBA to be compared to the trie mapping 160. The method 200 continues at block 206 where controller 114 executes the trie search algorithm and matches the portion of the LBA to the trie mapping 160 initialized in volatile memory 120.

Next, at decision block 208, if a region of FTL 150 is not identified, then the process proceeds back to block 204 where another portion of the LBA is incremented and, at block 206, controller 114 matches the next portion of the LBA to the trie mapping 160. Continuing with decision block 208, if a region of FTL 150 has been identified, the method 200 continues to block 210 where additional searching is performed on the identified region of FTL 150 without searching all individual entries of the FTL 150, thus constituting a narrowed search. In some embodiments, the method 200 may proceed in a single cycle. In other embodiments, the method 200 proceeds for a limited number of cycles until a region of FTL 150 is identified or stopped due to no matches, or due to a lack of remaining entries in the trie mapping 160.

Figure 3:
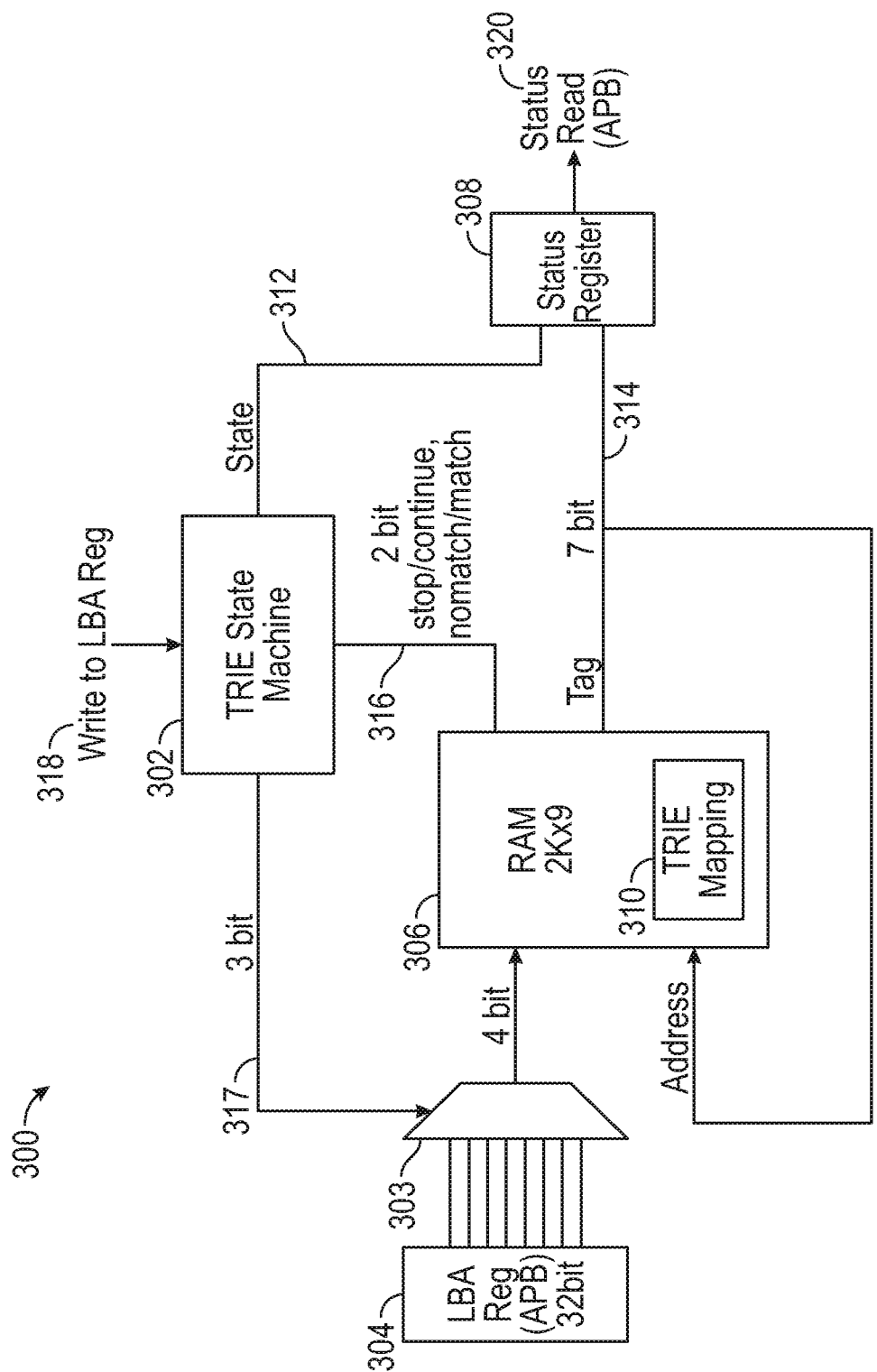
FIG. 3 is a schematic block diagram of a storage device controller employing a trie state machine to perform a directed fast search on a database in a RAM array, according to one embodiment.

FIG. 3 is a schematic block diagram of a data storage device controller running a trie search engine 300 to perform a directed fast search on a database in a RAM array, according to one embodiment. The trie search engine 300 is configured to perform the process illustrated in method 200 of FIG. 2, but other configurations are possible. In some embodiments, the trie search engine 300 may be integrated with controller 114 of storage device 102 of FIG. 1. In one embodiment, the trie search engine 300 is made of hardware components, but other embodiments are possible, including running the trie search engine 300 in firmware, or running the trie search engine as executable software on the controller 114. In some embodiments, the trie search engine 300 performs a recursive search on LBA's in the FLT 150, where the trie search engine 300 calls on itself during execution of the trie search algorithm. Yet other embodiments are possible and are not limited by the examples disclosed herein.

The trie search engine 300 includes a trie state machine 302 managing a multiplexer (MUX) 303 with a 3-bit control signal 317 for selecting which nibble of a 32 bit address is to be searched. The MUX 303 receives inputs from a LBA register 304, such as an advanced peripheral bus (APB) register having low complexity and low power usage. When a LBA or LBA range is written to the LBA register 304, the trie state machine 302 instructs MUX 303 to allow a portion of the LBA to be searched and matched to a pre-configured RAM 306 containing a trie mapping 310 to be searched. The trie state machine 302 searches the trie mapping 310 in one or a limited number of cycles in a process of incrementing through portions of the LBA and of sequencing through trie mapping 310 as disclosed in the method 200 of FIG. 2. Searching the trie mapping 310 returns a 7 bit tag 314 outputted to a status register 308, such as an APB register, indicating how to handle the LBA. For example, the tag 314 may provide a region of the FTL 150 (of FIG. 1) that the LBA falls in to narrow the scope of subsequent searches that are performed on the FTL 150 by the trie search engine 300. The trie search engine 300 also includes a write to LBA register signal 318 that is generated by the controller 114 and is sent to the trie state machine 302 whenever the LBA register 304 is updated with fresh data. The write to LBA register signal 318 is used by the trie state machine 302 to reset the trie state machine 302 to a known state as new data is being processed by the trie search engine 300.

In some embodiments, the trie search engine 300 may avoid the problem of searching and comparing a LBA to every entry of the FTL 150 by conducting a directed search. Embodiments of the trie search engine 300 may initialize the trie mapping 310 in RAM 306 so that the trie state machine 302 may rapidly sequence through the RAM 306 for an output of a region in which the LBA falls on in the FTL 150. For searches on LBA's or LBA ranges, matches may be found prior to reaching the end of the LBA vector. For example, for a LBA of 32 bits, not all 32 bits are required to be searched and matched in the trie mapping 310.

In the following example, the trie search engine 300 returns the tag 314 for the region a LBA, or LBA range, falls on in the FTL 150 for a duration lasting between one and eight cycles. A 32 bit LBA is placed in the LBA register 304. The LBA address is divided into eight nibbles of four bits each. The trie state machine 302 selects one of the nibbles by issuing the control signal 317 and uses the nibble with an address from RAM 306 to indicate an 11 bit trie RAM address using 4 bits for the nibble and 7 bits for the RAM page.

The output of RAM 306 is used in the next cycle of incrementing through portions of LBA. In some embodiments, the RAM 306 output (e.g.: the tag 314) is outputted to the status register 308 identifying how the LBA should be handled, such as a region of the FTL 150 in which the LBA falls. In addition, another output of the RAM 306 (a match/no-match signal 316 made of 2 bits) is sent through the trie state machine 302 and to the status register 308. The trie state machine 302 generates a state value 312 (value) and sends the state 312 to the status register 308. For example, the state 312 may be expressed by the following: 00=search in process; 01=search complete—no match; 10=partial match; and 11=search complete—match. The trie state machine 302 uses the match/no-match signal 316 to signal the controller 114 to continue or stop incrementing through portions of the LBA.

The trie state machine 302 uses a 7 bit page address provided by RAM 306 with the next incremented nibble of the LBA on LBA register 304 until a match is found, until no match is found, or a partial match is found in the trie mapping 310. Therefore, the method 200 can be completed between one cycle (i.e., using one nibble) and eight cycles (i.e., incrementing through all eight nibbles of the LBA address). In some embodiments, the RAM 306 may be a 2K×9 bit wide RAM with an output of 2 bits for the match/no-match signal 316 and 7 bits for the page location (e.g.: tag 314). In another embodiment not shown, the RAM 306 may be sized to support searching and matching of any desired number of LBA regions of a FTL 150. Once the trie state machine 302 has run one or more cycles, a status read signal 320 is output through the status register 308 and sent to the controller 114 for further action. Based on the value of the status read signal 320, the controller 114 can decide to continue the trie search engine 300 or stop the process entirely.

FIG. 4 is one example of a FLT 400 showing a table of LBA's organized into a plurality of regions as used by the trie mapping method 200 of FIG. 2, according to one embodiment. The LBAs may be organized in any number of regions of the FTL 150. Example FTL 400 includes several LBA regions of interest numbered 402, 404, 406, 408, 410, 412, 414, 416, and 418. The example FLT 400 also includes a LBA start address 420, a LBA end address 422, and a range of address 424 to match on with the trie mapping 160 of FIG. 1. FIG. 4 discloses one embodiment of the FTL 150 of FIG. 1, and other embodiments are possible.

FIG. 5 is an example trie mapping data table 500 (example trie mapping) as stored in RAM 306 (of FIG. 3) containing results of a directed search, according to one embodiment. The example trie mapping 500 includes multiple row entries 530, 532, 534, 536, 538, 540, 542, 544, 546, 548, 550, 552, 554, 556, 558, 560 and multiple page columns 502, 504, 506, 508, 510, 512, 514, 516, 518, 520, 522, 524. In FIG. 5, RAM 306 is organized as pages 0-11 502, 504, 506, 508, 510, 512, 514, 516, 518, 520, 522, 524. Each page has 16 entries, and RAM 306 is initialized with 192 entries. The first symbol in each entry is a portion of the LBA address matched within the specific page. Then, each entry either has the term "Cont", "Match", or "No Match." The term "Cont" in an entry indicates to the trie state machine 302 to continue to the page indicated on the last number of the entry. The term "Match" in an entry indicates to the LBA falls in the FTL 150 region indicated on the last number of the entry. Finally, the term "No Match' in an entry indicates to the trie state machine 302 that the LBA does not match any regions of the FTL.

The 7 bit page address or tag 314 of the RAM 306 entries indicates the next page of sixteen entries to be accessed, while the 2 bit match/no-match signal 316 indicates to the trie state machine 302 whether to increment through another portion of the LBA address, return the tag 314 for the region to match, or that no match is found in the example trie mapping 400. The following example of matching a LBA is described in reference to FIGS. 3, 4, and 5, but other search engines, FTL 150 regions and trie mappings 160 are possible.

In this example, a LBA of symbols 2E4123 is written on LBA register 304 of trie search engine 300 for memory addressing. In a first cycle, the trie state machine 302 selects the first symbol of "2" from the LBA 2E4123 and searches for a match on page 0 (502 of FIG. 5) of trie mapping 310 for the symbol "2". The symbol '2' is found on the entry "2 Cont 1" 534 (of FIG. 5) on page 0 502. A status of "Continue" is outputted to trie state machine 302 to increment the next portion of the LBA address 2E4123 returning the symbol "E" from mux 303 for a second cycle.

In the second cycle, the "1" in the entry "2 Cont 1" 534 of the first cycle provides the RAM 306 data address of page 1 504 in conjunction with searching for symbol "E". The symbol "E" is found on entry "E Cont 5" 558 on page 1 504. A status of "Continue" is outputted to trie state machine 302 to increment the next portion of the LBA address 2E4123, returning the symbol "4" from mux 303 for a third cycle.

In the third cycle, the "5" in the entry "E Cont 5" 558 of the second cycle provides the RAM 306 data address of page 5 512 in conjunction with searching for symbol "4". The symbol "4" is found on entry "4 Match 3" 538 of page 5 512. A status of "Match" is outputted to trie state machine 302 and cycling or incrementing through the LBA stops. The region three is then outputted to status register 308. Therefore, the location of LBA 2E4123 is narrowed to region three out of nine total regions. Thus, the matching of LBA's is greatly reduced since not all entries of a FTL 150 need to be searched and matched for memory addressing.

FIG. 5 is only one embodiment that uses the example trie mapping 400 organized in the RAM 306 to provide a directed search. FIGS. 4 and 5 are described in reference to the trie search engine 300 of FIG. 3, but other configurations are possible.

In one example, the trie search engine 300 disclosed in FIGS. 2-5 operates as follows. The process of operating the trie search engine 300 begins with the data storage device 102 receiving an access request from a host device 104 of a LBA (or LBA range). The request may include reading/writing data or marking data for deletion. The LBA regions of interest 402, 404, 406, 408, 410, 412, 414, 416, 418 each disclose a range of LBA's. For example, LBA region of interest 402 includes a LBA with a start address of 27000 to an end address of 29FFFF. The controller 114 selects which one of the 32 bit LBA's is loaded into the LBA register 304.

In this example, each LBA is made of 8 4-bit nibbles. The trie search engine 300 processes one nibble at a time, with the trie state machine 302 selecting which 4-bit nibble is loaded into the MUX 303 to be compared to the trie mapping 160. The trie state machine 302 selects which of the 8 nibbles is to be used based on the 3-bit control signals 317 sent from the trie state machine 302 to the MUX 303. Next, the controller executes the trie search engine 300 in an effort to match the nibble selected earlier to the trie mapping region of the FTL stored in the RAM 306. The trie search engine then compares the nibble to the FTL to determine if any portion of the LBA matches an entry in the FTL.

The trie search engine is operated repeatedly until a match is found, or until the full range of LBA's have been searched. For each LBA, each search requires up to 8 cycles to search all eight nibbles that make up one LBA. When a match is made between the nibble of the LBA and the trie mapping 310, the search in the FTL is correspondingly narrowed, and the trie search engine 300 is rerun until all LBA regions of interest 402, 404, 406, 408, 410, 412, 414, 416, 418 are searched and matches identified. Once a match is made, the RAM 306 generates the match/no-match signal 316 and sends it to the trie state machine 302. The RAM 306 also generates the tag 314 with which LBA range to search for next. Both the state signal 312 and the tag 314 are sent to the Status register 320 to the sent to the controller 114. Across multiple cycles, the trie sear engine 300 cycles through each nibble of all of the LBA's of interest and sends the state 312 of the present search and the next address to the controller 114 for further action.

This disclosure includes a method of searching a database that includes executing a trie search algorithm on a first portion of data in the database, returning a tag narrowing a location of the first portion of data to optimize the database, and performing a directed search of the optimized database by executing the trie search algorithm again on the optimized database, wherein the trie search algorithm is an information retrieval data structure using a M-ary tree where each node consists of a M-positional vector of pointers.

The method may also include where the data is a range of LBA's. The method also includes where the trie search algorithm includes a recursive search operation configured to search ranges of LBA's. The method also includes where the tag indicates a full match, a partial match, or no match of the data being searched. The method also includes where the data includes at least one of a write-protect region of the database, enhanced user data, and logical-to-physical address translation data.

This disclosure also includes a method of accessing data from a data storage device that includes receiving, from a host device, an access request directed at a LBA, selecting a first portion of the LBA, performing a trie mapping of LBA's of a flash translation layer of the data storage device, wherein the flash translation layer includes a data address translation table, matching incremented first portions of the LBA to the trie mapping of a region of the flash translation layer, identifying a first region of interest in the flash translation layer where the LBA is located, narrowing a search of the LBA to the first region of interest, and returning a status signal to the data storage device indicating the results of the trie mapping.

The method may also include where the method is run multiple cycles until the first region of interest in the flash translation layer is identified. The method may also include selecting a second portion of the LBA and rerunning the method if the first region of interest of the flash translation layer is not identified. The method may also include a trie mapping of LBA's of a second region of interest of the flash translation layer.

The disclosure also includes a data storage device having a volatile memory with a first flash translation layer, where the flash translation layer includes a data address translation table, and a trie mapping of logical block address regions of the first flash translation layer, and a non-volatile memory array comprising one or more memory devices. The data storage device also includes a controller coupled to the volatile memory and coupled to the non-volatile memory, the controller having one or more processors operable to increment through portions of a received LBA and match incremented portions of the received LBA to the trie mapping. The data storage device also includes means for accessing data from the data storage device using a trie search algorithm.

The data storage device may also include where at least one memory device contains a second flash translation layer. The data storage device may also include where the first flash translation layer includes data entries of LBA's and a corresponding physical data address. The data storage device may also include where the first flash translation layer includes an index that encodes LBA's of each entry. The data storage device may also include where the controller consolidates multiple LBA's into a LBA container, where the controller fully specifies a physical data address corresponding to the LBA. The data storage device may also include where a copy of the first flash translation layer is stored in the one or more memory devices.

The disclosure also includes a storage device having a controller with one or more processors configured to execute a trie search algorithm, where the trie search algorithm searches for LBA's in a flash translation layer, and where the flash translation layer includes a data address translation table. The storage device also includes a RAM array configured to store results from the trie search algorithm, a trie state machine, a LBA register, an input demultiplexer electrically coupled to the LBA register, and an output demultiplexer electrically coupled to the RAM array and the trie state machine, where the device generates an output signal that includes a state of the trie search algorithm.

The storage device may also include where the state is one of a full match, a partial match, or no match. The storage device may also include where a trie mapping database is stored in the RAM array. The storage device may also include where the device stops searching upon reaching a full match prior to reaching the end of a LBA vector. The storage device may also include where the RAM array is sized to support searching and matching of any number of LBA regions of the flash translation layer.

The disclosure also includes a method of writing data to a trie mapping table that includes initializing a region in a memory device with one or more ranges of LBA's of interest, selecting which LBA ranges are to be searched for matches, searching the region based on the LBA ranges, identifying all full matches, partial matches, and no matches for each entry of the LBA ranges, and storing the LBA ranges and the results of the search into a trie mapping table of a memory device.

The method may also include where the trie mapping table is stored in non-volatile memory of a storage device. The method may also include searching the region of memory again whenever data is written to the trie mapping table. The method may also include returning a tag to the controller indicating a region number where a full match occurred. The method may also include updating a status register with a LBA and match data associated with that LBA.

The above described method of operation provide for improved speed while accessing data from data storage devices. With improved speed, the method also uses less power, thus also reducing power usage. Specifically, the method allows for the controller of a data storage device to fully or partially match LBA's to a trie mapping and using the full or partial match to further narrow a subsequent search of LBA's. Thus stated, the methods and devices disclosed herein improve performance of data storage devices and associated searches and retrieval of data.

While the foregoing is directed to embodiments of the present disclosure, other and further embodiments of the disclosure may be devised without departing from the basic scope thereof, and the scope thereof is determined by the claims that follow.

What is claimed is:

1. A method of accessing data from in a data storage device, comprising:
    receiving, from a host device, an access request directed at a logical block address comprising a plurality of nibbles;
    selecting a first nibble of the plurality of nibbles of the logical block address;
    matching the first nibble of the plurality of nibbles of the logical block address through a first page of a trie mapping to an identified region of a flash translation layer without selecting all of the plurality of nibbles of the logical block address; and
    searching, based on a result of the matching, the identified region of the flash translation layer without searching all individual entries of the flash translation layer.

2. The method of claim 1, further comprising, prior to selecting the first nibble:
    selecting a second nibble of the plurality of nibbles of the logical block address; and
    matching the second nibble of the plurality of nibbles of the logical block address through a second page of the trie mapping to the first page of the trie mapping.

3. A data storage device, comprising:
    a memory device configured to store:
        a first flash translation layer, wherein the first flash translation layer includes a data address translation table; and
        a first page of a trie mapping to an identified logical block address (LBA) region of LBA regions of the first flash translation layer;
    a non-volatile memory array comprising one or more flash memory devices; and
    a controller coupled to the memory device and coupled to the non-volatile memory array, the controller comprising one or more processors operable to:
        receive an access request of a (LBA) comprising a plurality of nibbles;
        select a first nibble of the LBA to be compared to the first page of the trie mapping;
        match the first nibble of the LBA through the first page of the trie mapping to the identified LBA region of the first translation layer without selecting all of the plurality of nibbles of the LBA; and
        search, based on a result of the first nibble matched to the identified LBA region, on the identified LBA region of the first flash translation layer without searching all of the LBA regions of the first flash translation layer.

4. The device of claim 3, wherein the memory device contains a second flash translation layer.

5. The device of claim 3, wherein the first flash translation layer includes data entries of logical block addresses and a corresponding physical data address.

6. The device of claim 3, wherein the first flash translation layer includes an index that encodes logical block addresses of each entry.

7. The device of claim 3, wherein the controller is further configured to consolidate multiple logical block addresses into a logical block address container, wherein the controller is further configured to fully specify a physical data address corresponding to the logical block address.

8. The device of claim 3, wherein the controller is further configured to, prior to selecting the first nibble:
    select a second nibble of the LBA;
    match the second nibble of the LBA through a second page of the trie mapping to the first page of the trie mapping.

* * * * *